US012762765B2

(12) United States Patent
Zhang et al.

(10) Patent No.: US 12,762,765 B2

(45) Date of Patent: Oct. 13, 2026

(54) METHOD AND APPARATUS FOR CONVERSION INTO SKETCHES FOR GEOMETRICAL REPRESENTATION LEARNING

(71) Applicant: SEOUL NATIONAL UNIVERSITY R&DB FOUNDATION, Seoul (KR)

(72) Inventors: Byoung-Tak Zhang, Seoul (KR); Hyundo Lee, Seoul (KR); Inwoo Hwang, Seoul (KR); Hyunsung Go, Seoul (KR); Won-Seok Choi, Seoul (KR); Kibeom Kim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 117 days.

(21) Appl. No.: 18/660,788

(22) Filed: May 10, 2024

(65) Prior Publication Data

US 2025/0022193 A1 Jan. 16, 2025

(30) Foreign Application Priority Data

Jul. 10, 2023 (KR) ........................ 10-2023-0089433

(51) Int. Cl.

*G06T 11/23* (2026.01)
*G06T 7/60* (2017.01)
(Continued)

(52) U.S. Cl.

CPC ................ *G06T 11/23* (2026.01); *G06T 7/60* (2013.01); *G06V 10/44* (2022.01); *G06V 10/462* (2022.01); *G06V 10/764* (2022.01); *G06V 20/70* (2022.01)

(58) Field of Classification Search

CPC ......... G06T 11/203; G06T 7/60; G06V 20/70; G06V 10/462; G06V 10/44; G06V 10/764

See application file for complete search history.

(56) References Cited

U.S. PATENT DOCUMENTS 9,858,694 B1 * 1/2018 Das ........................ G06T 11/203
10,521,937 B2 * 12/2019 Severenuk ............. G06V 30/32
(Continued)

FOREIGN PATENT DOCUMENTS

CN 111476867 A 7/2020
CN 114926843 A * 8/2022 ........... G06T 11/203
(Continued)

OTHER PUBLICATIONS

Pande, A., Kukretti, A., & Parihar, A. S. (2023). Comparative analysis of attention-based sketch recognition. 2023 14th International Conference on Computing Communication and Networking Technologies (ICCCNT), 1-6. https://doi.org/10.1109/icccnt56998.2023.10307792 (Year: 2023).*
(Continued)

*Primary Examiner* — Tammy Goddard
*Assistant Examiner* — Aidan W McCoy
(74) *Attorney, Agent, or Firm* — Bridgeway IP Law Group, PLLC; Jihun Kim

(57) ABSTRACT

Proposed herein are an apparatus and method for conversion into sketches. The apparatus for conversion into sketches includes: an input/output interface configured to receive an image and output the results of processing of the image; storage configured to store a program for performing a method for conversion into sketches; and a controller including at least one processor, and configured to convert the image into a sketch by executing the program. The controller receives (i) initial stroke information having attribute parameters and (ii) image information about a target image, converts the target image into a plurality of final strokes having geometric information about the target image by using a stroke generation model, and outputs the results of data processing of the plurality of final strokes.

7 Claims, 8 Drawing Sheets

(51) Int. Cl.

| | |
|---|---|
| ***G06V 10/44*** | (2022.01) |
| ***G06V 10/46*** | (2022.01) |
| ***G06V 10/764*** | (2022.01) |
| ***G06V 20/70*** | (2022.01) |

(56) References Cited

U.S. PATENT DOCUMENTS

| | | | | |
|---|---|---|---|---|
| 11,880,913 | B2 * | 1/2024 | Hertzmann | G06N 3/0475 |
| 2012/0169759 | A1 * | 7/2012 | Patil | G06T 11/203<br>345/441 |
| 2016/0328866 | A1 * | 11/2016 | Neulander | G06T 11/20 |
| 2020/0005502 | A1 * | 1/2020 | Sheffer | G06T 11/203 |
| 2020/0320401 | A1 * | 10/2020 | Jampani | G06T 7/143 |
| 2021/0303825 | A1 * | 9/2021 | Soni | H04N 23/64 |
| 2024/0378775 | A1 * | 11/2024 | Pandey | G06T 7/60 |

FOREIGN PATENT DOCUMENTS

| | | | | |
|---|---|---|---|---|
| EP | 4270320 | A1 * | 11/2023 | G06T 11/203 |
| KR | 10-2014-0035333 | A | 3/2014 | |
| KR | 10-2020-0073703 | A | 6/2020 | |
| KR | 10-2197653 | B1 | 1/2021 | |
| KR | 10-2213861 | B1 | 2/2021 | |
| KR | 10-2403256 | B1 | 5/2022 | |
| KR | 10-2410047 | B1 | 6/2022 | |
| KR | 10-2023-0062429 | A | 5/2023 | |

OTHER PUBLICATIONS

Yang, B., Chen, X., Wang, C., Zhang, C., Chen, Z., & Sun, X. (2023). Semantics-preserving sketch embedding for face generation. IEEE Transactions on Multimedia, 25, 8657-8671. https://doi.org/10.1109/tmm.2023.3239182 (Year: 2023).*

D. Liu, M. Fisher, A. Hertzmann and E. Kalogerakis, "Neural Strokes: Stylized Line Drawing of 3D Shapes," 2021 IEEE/CVF International Conference on Computer Vision (ICCV), Montreal, QC, Canada, 2021, pp. 14184-14193, doi: 10.1109/ICCV48922.2021.01394. (Year: 2021).*

R. N. Lasrado and V. Vijayasherly, "Unconditional Generation of Scalable Chinese Characters as Bezier Curve Sequences," 2023 3rd International conference on Artificial Intelligence and Signal Processing (AISP), Vijayawada, India, 2023, pp. 1-7, doi: 10.1109/AISP57993.2023.10134921. (Year: 2023).*

Yael Vinker et al., "CLIPasso: semantically-aware object sketching", ACM Transactions on Graphics, Jul. 22, 2022, pp. 1-11, vol. 41, Issue 4, Article No. 86, URL: https://doi.org/10.1145/3528223.3530068.

Hyundo Lee et al., "Learning Geometry-aware Representations by Sketching (CVPR 2023)", Apr. 14, 2023, URL: https://github.com/illhyhl1111/LearningBySketching.

Hyundo Lee et al., "Learning Geometry-aware Representations by Sketching", Apr. 17, 2023, pp. 1-24, arXiv:2304.08204v1, URL: https://arxiv.org/abs/2304.08204.

* cited by examiner

METHOD AND APPARATUS FOR CONVERSION INTO SKETCHES FOR GEOMETRICAL REPRESENTATION LEARNING

CROSS-REFERENCE TO RELATED APPLICATION

This application claims the benefit of Korean Patent Application No. 10-2023-0089433 filed on Jul. 10, 2023, which is hereby incorporated by reference herein in its entirety.

BACKGROUND

1. Technical Field

The embodiments disclosed herein relate to a method and apparatus for converting images into sketches, and more particularly to a method and apparatus for conversion into sketches that learn representations for geometric features of images without using a learning sketch dataset.

The embodiments disclosed herein were derived as a result of the research on the task "Artificial Intelligence Innovation Hub" (Task management number: IITP-2021-0-02068) and task "Artificial Intelligence Graduate School Program (Seoul National University)" (Task management number: IITP-2021-0-01343) of the Information, Communications, and Broadcasting Innovative Talent Nurturing Project sponsored by the Korean Ministry of Science and ICT and the Institute of Information & Communications Technology Planning & Evaluation.

The embodiments disclosed herein were derived as a result of the research on the task "Development of Uncertainty-Aware Agents Learning by Asking Questions" (Task management number: IITP-2022-0-00951) and task "Self-directed AI Agents with Problem-solving Capability" (Task management number: IITP-2022-0-00953) of the Human-Centered Artificial Intelligence Core Fundamental Technology Development Project sponsored by the Korean Ministry of Science and ICT and the Institute of Information & Communications Technology Planning & Evaluation.

2. Description of the Related Art

Transfer learning is a technique that reuses a model having learned a specific task for another task. The task learned first is called an upstream task, and the task to be learned next is called a downstream task. Transfer learning speeds up learning and allows a new, actual target task to be performed better.

Representation Learning refers to a process of learning that is aimed at extracting important features of data. When representation learning is performed on image data, understanding geometric concepts such as distance and shape and preserving this information can provide important information for various downstream tasks that utilize visual information.

Conventional methods for geometrical representation learning include methods of representing geometric features of images in a two-dimensional grid structure such as convolutional neural network (CNN)-based feature extraction and a segmentation map. These methods have difficulty in converting into a vector form and give priority to representing unnecessary features such as the background of an image. There are also methods that aim to convert geometric concepts into concise vector space representations, but they are designed to learn only specific geometric concepts. Accordingly, it is difficult to perform generalization.

Sketching is an image-based representation method that aims to capture only the salient features of an image and represent them abstractly with a limited number of strokes. Conventional machine learning models for the generation of sketches rely on a sketch dataset to learn the style of sketches generated by humans. However, the sketch dataset is not designed to preserve geometric information or the process of abstracting an image is missing in the sketch dataset, so that a problem arises in that a trained sketch model does not achieve the purpose of accurately abstracting an image while preserving the geometric shape of the image.

Non-patent document 1 (Paper, Vinker, Yael, et al. "CLIPasso: Semantically-Aware Object Sketching" ACM Transactions on Graphics (TOG) 41.4 (2022): 1-11.) discloses a technology that generates sketches without a sketch dataset. The technology disclosed in non-patent document 1 is implemented through an optimization-based technique. Accordingly, it takes an excessively long time to generate a representation of an image through thousands of steps of optimization, and the technology is numerically unstable due to variant results. Therefore, a problem arises in that it is impractical to use the technology as a representation learning model.

For reference, patent document 1 (Korean Patent No. 10-2403256 published on May 24, 2022) discloses an invention regarding a method of generating freehand sketch images for machine learning, patent document 2 (Korean Patent No. 10-2197653 published on Dec. 24, 2020) discloses an invention regarding a sketch-line conversion method, and patent document 3 (Korean Patent Application Publication No. 10-2023-0062429 published on May 9, 2023) discloses an invention regarding a sentence-based sketch recommendation method. The technologies disclosed in patent documents 1 to 3 only disclose a general scheme using a sketch dataset that does not preserve geometric information or has not undergone an abstraction process such as simple edge detection. However, they do not provide a scheme that does not require a sketch dataset and generates abstracted sketches that desirably reflect geometric information through a single inference step.

SUMMARY

An object of the embodiments disclosed herein is to provide an apparatus and method for conversion into sketches that convert an input image into a stroke-based sketch that preserves the geometric information of the image in a single inference step without requiring a separate sketch dataset through a learning model for converting an input image into a colored abstract sketch and that also provide a stroke representation so that it can be used as a representation learning model for an additional task.

Other objects and advantages of the present invention can be understood from the following description and will be more clearly understood by means of the embodiments. Furthermore, it will be readily apparent that the objects and advantages of the present invention can be embodied by the means and combinations thereof described in the attached claims.

As a technical solution for accomplishing the above-described object, there is provided an apparatus for conversion into sketches, the apparatus including: an input/output interface configured to receive an image and output the results of processing of the image; storage configured to store a program for performing a method for conversion into sketches; and a controller including at least one processor, and configured to convert the image into a sketch by executing the program; wherein the controller receives (i) initial stroke information having attribute parameters and (ii) image information about a target image, converts the target image into a plurality of final strokes having geometric information about the target image by using a stroke generation model, and outputs the results of data processing of the plurality of final strokes.

According to another embodiment, there is provided a method for conversion into sketches, the method being performed by an apparatus for conversion into sketches, the method including: receiving (i) initial stroke information having attribute parameters and (ii) image information about a target image, and converting the target image into a plurality of final strokes having geometric information about the target image by using a stroke generation model; and outputting the results of data processing of the plurality of final strokes.

According to still another embodiment, there is provided a non-transitory computer-readable storage medium having stored thereon a program that, when executed by a processor, causes the processor to execute the method for conversion into sketches.

According to still another embodiment, there is provided a computer program that is executed by an apparatus for conversion into sketches and stored in a non-transitory computer-readable storage medium to perform the method for conversion into sketches.

BRIEF DESCRIPTION OF THE DRAWINGS

The accompanying drawings illustrate the embodiments disclosed in the present specification, and serve to help the further understanding of the technical spirit disclosed in the present specification along with specific details for carrying out the invention. The content disclosed in the present specification should not be construed as limited to the items described in the drawings.

DETAILED DESCRIPTION

Figure 1:
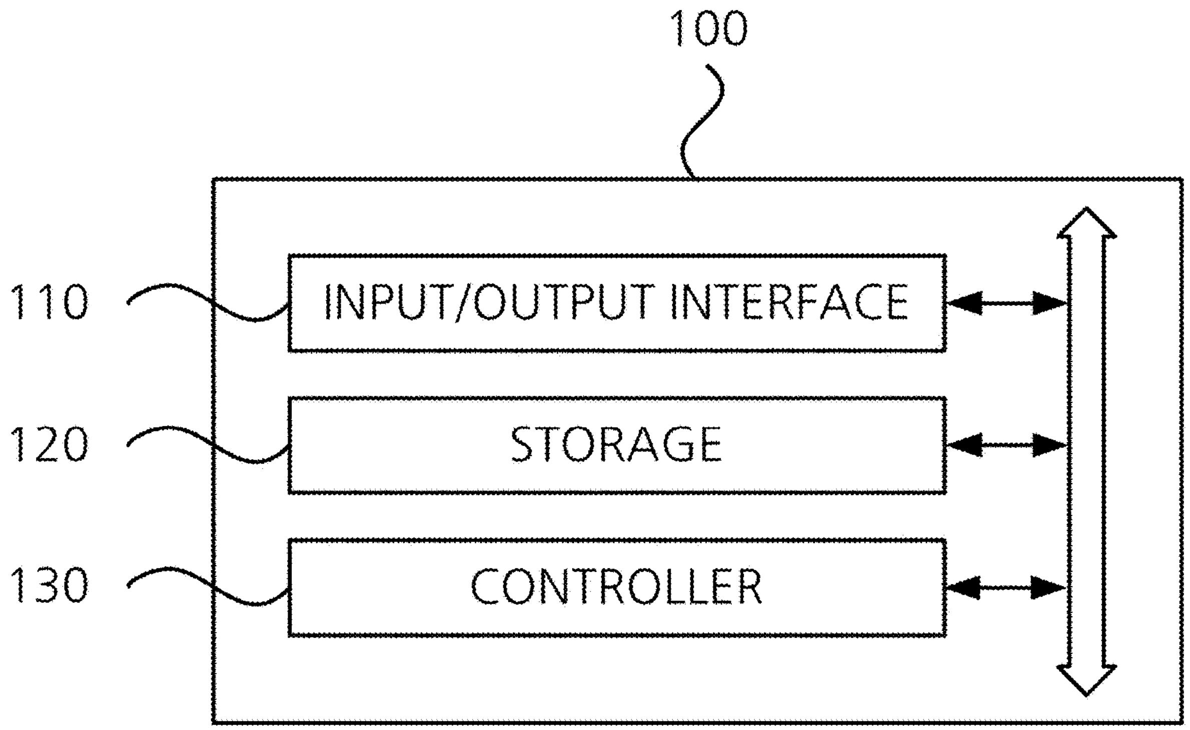
FIG. 1 is a block diagram illustrating the functional configuration of an apparatus for conversion into sketches according to an embodiment.

Various embodiments will be described in detail below with reference to the accompanying drawings. The following embodiments may be modified and practiced in various different forms. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is "directly connected" to the other component but also a case where the one component is "connected to the other component with a third component disposed therebetween." Furthermore, when one component is described as "including" another component, this does not mean that the one component does not exclude a third component but means that the one component may further include a third component, unless explicitly described to the contrary.

Hereinafter, embodiments will be described in detail with reference to the accompanying drawings.

These embodiments are directed to a stroke representation learning for converting images into sketches, and an algorithm for implementing this can be referred to as "Learning By Sketching (LBS)."

In the embodiments, strokes used in sketches are used as representations including geometric information. Sketches are representative means for preserving geometric structures when humans represent images. Sketches are suitable for naturally representing general geometric concepts, and can be represented concisely through the process of being abstracted based on the high-level understanding of a scene and the process of converting strokes used in a sketch into a parameterized vector.

FIG. 1 is a block diagram illustrating the functional configuration of an apparatus 100 for conversion into sketches according to an embodiment.

Referring to FIG. 1, the apparatus 100 for conversion into sketches according to the present embodiment includes an input/output interface 110, storage 120, and a controller 130.

The input/output interface 110 may include an input interface configured to receive input from a user, and an output interface configured to display information such as the results of performance of a task or the state of the apparatus 100 for conversion into sketches. In other words, the input/output interface 110 is a component configured to receive data and output the results of operation of the data. The apparatus 100 for conversion into sketches according to an embodiment may receive an image, image feature information, and initial strokes through the input/output interface 110.

The storage 120 is a component configured to store files and programs, and may be implemented using various types of memory. In particular, the storage 120 may store data and a program that enable the controller 130, which will be described later, to perform an operation for conversion into a sketch according to the algorithm to be presented below. For example, the storage 120 may store a constructed learning model.

The controller 130 is a component including at least one processor such as a CPU, a GPU, an Arduino, or the like, and may control the overall operation of the apparatus 100 for conversion into sketches. That is, the controller 130 may control other components included in the apparatus 100 for conversion into sketches to perform an operation for conversion into a sketch. The controller 130 may perform an operation for stroke processing according to the algorithm to be presented below by executing the program stored in the storage 120.

The controller 130 receives (i) initial strokes having attribute parameters and (ii) image information about a target image, and converts them into a plurality of final strokes having geometric information about the target image by using a stroke generation model. The controller 130 outputs the results of data processing of the plurality of final strokes.

In the operation of outputting the results of data processing of the plurality of final strokes, the controller 130 may receive the plurality of final strokes, may generate a final sketch by using a stroke rendering model, and may output the final sketch.

In the operation of outputting the results of data processing of the plurality of final strokes, the controller 130 may select a plurality of representations from among (i) a representation of the image information, (ii) a representation of the plurality of final strokes, and (iii) a representation of all the strokes obtained by mapping the plurality of final strokes to an embedding space, may combine the plurality of representations into a stroke representation set, and may output the stroke representation set.

Figure 2:
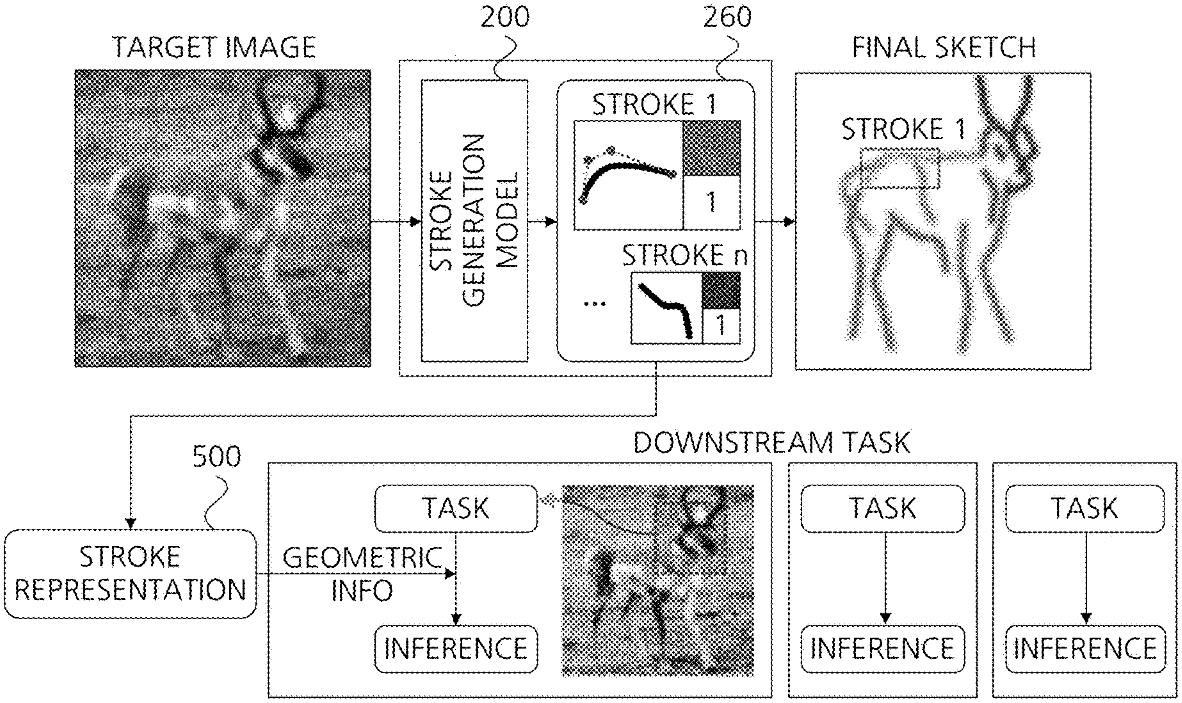
FIG. 2 is a diagram illustrating an operation in which an apparatus for conversion into sketches according to an embodiment converts an image into a sketch and outputs a stroke representation.

FIG. 2 is a diagram illustrating an operation in which an apparatus for conversion into sketches according to an embodiment converts an image into a sketch and outputs a stroke representation.

The apparatus 100 for conversion into sketches generates a plurality of strokes 260 from a target image through a stroke generation model (a stroke generator) 200. The apparatus 100 for conversion into sketches may generate a final sketch by using the plurality of strokes 260. The apparatus 100 for conversion into sketches may output a stroke representation 500 for the plurality of strokes 260 and provide geometric information to a downstream task. The downstream task may perform the processing of visual information, such as inference, by utilizing the geometric information of the stroke representation.

The apparatus 100 for conversion into sketches receives (i) initial stroke information having attribute parameters and (ii) image information about a target image, gradually updates intermediate strokes through the intermediate layers of the stroke generation model 200 based on the initial stroke information and the image information, and converts the gradually updated intermediate strokes into a plurality of final strokes having geometric information about the target image through the final layer of the stroke generation model. The attribute parameters include attributes related to curve control points, color, and thickness, and may be learned through a learning model.

The stroke representation output by the apparatus 100 for conversion into sketches may include a stroke representation set obtained by selecting two or more from among (i) a representation of the image information, (ii) a representation of the plurality of final strokes, and (iii) a representation of all the strokes obtained by mapping the plurality of final strokes to an embedding space, and then combining them.

The apparatus 100 for conversion into sketches applies a learning model for generating an abstract sketch while preserving the geometric information of the input image, generates a series of strokes required for sketching an image through a learning model, and converts them into an image representation required for another task. For this purpose, there may be used an architecture based on a transformer model for learning context and meanings by tracking the relationships of sequential data.

The apparatus 100 for conversion into sketches may extract geometric information by using a stroke generation model for using image information and initial strokes, which are learnable parameters, as input and converting them into strokes used in a final sketch.

The apparatus 100 for conversion into sketches may generate strokes including a plurality of control points that parameterize a curve, color information and thickness information, and may generate a final sketch through a differentiable stroke rendering model (a differentiable rasterizer) based on the generated series of strokes.

The apparatus 100 for conversion into sketches may use a perceptual loss function based on a contrastive language image pretraining (CLIP) model disclosed in non-patent document 1 in order to measure the similarity between the generated sketch and the original image. A numerically stable representation is generated using an optimization-based approach as guidance information for the stroke generation model, which is a single inference model, and the intermediate strokes obtained at respective intermediate steps of an optimization process may be used as guide information for the intermediate layers of the stroke generation model in order to generate a high-quality sketch.

The apparatus 100 for conversion into sketches may generate a representation of all strokes through a stroke embedding network and supplement the local and detailed information, represented by strokes, with information about the overall image.

Figure 3:
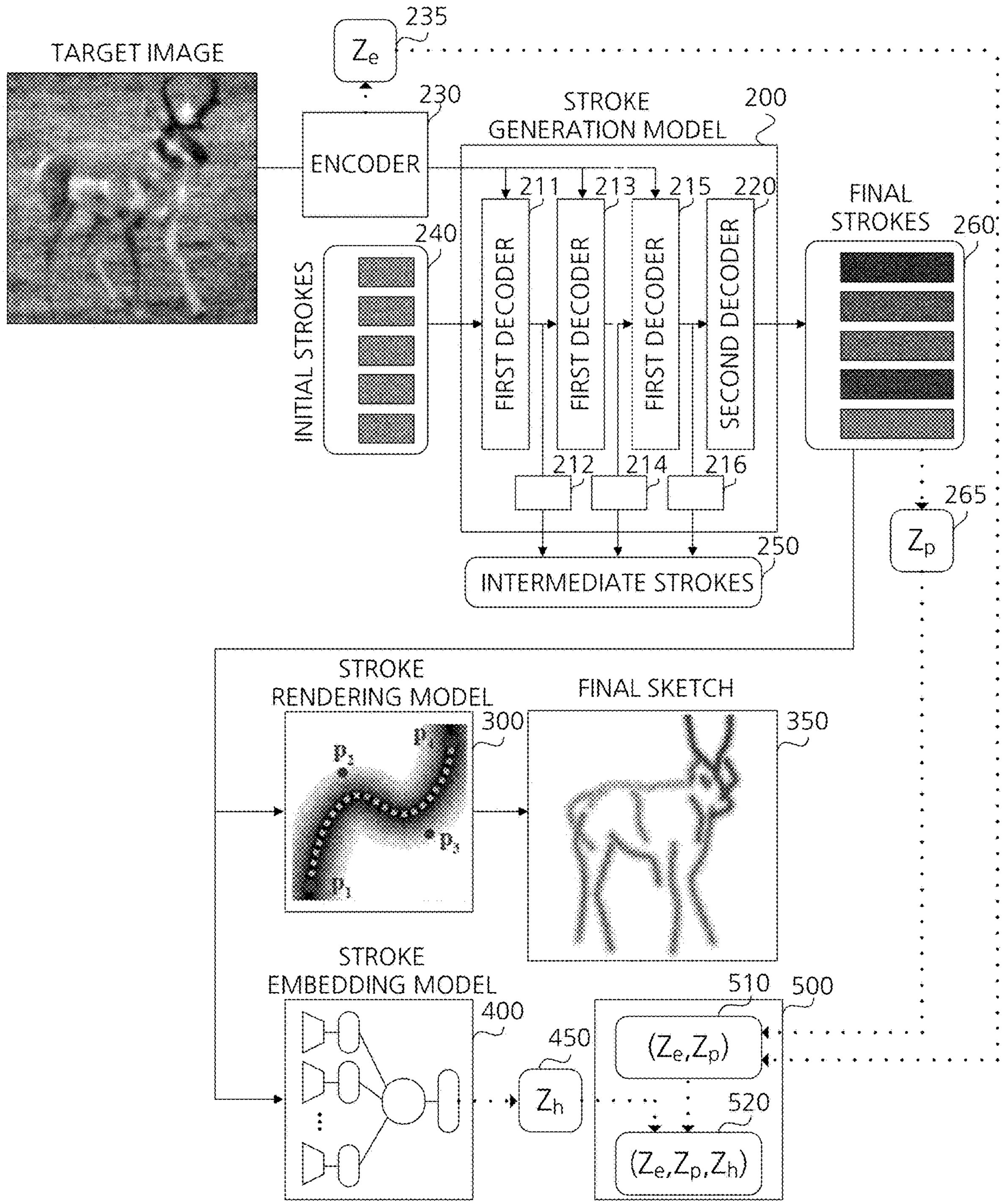
FIG. 3 is a diagram illustrating the overall operation of the learning model of an apparatus for conversion into sketches according to an embodiment.

FIG. 3 is a diagram illustrating the overall operation of the learning model of the apparatus 100 for conversion into sketches according to an embodiment.

The learning model applied to the apparatus 100 for conversion into sketches includes the stroke generation model 200. The learning model may include the stroke generation model 200 and a stroke rendering model 300. The learning model may include the stroke generation model 200 and a stroke embedding model 400. The learning model may include the stroke generation model 200, the stroke rendering model 300, and the stroke embedding model 400. The stroke rendering model 300 may be connected to the stroke generation model 200, and the stroke embedding model 400 may be connected to the stroke generation model 200.

The stroke generation model 200 may include an encoder 230, or may receive data, processed by the encoder 230, from the outside.

The encoder 230 is a model configured to extract image features from an image. A convolutional neural network (CNN)-based feature extraction model may be applied as the encoder.

The stroke generation model 200 may include a plurality of decoders 211, 213, 215, and 220. The decoders 211, 213, 215, and 220 convert input strokes and output the strokes obtained through the conversion.

The decoders 211, 213, 215, and 220 include first decoders 211, 213, and 215 and a second decoder 220. The first decoders 211, 213, and 215 use the output of the encoder 230 as an additional input, and the second decoder 220 does not use the output of the encoder 230 as an input. That is, the first decoders 211, 213, and 215 receive strokes (e.g., initial strokes 240, etc.) and image information, and the second decoder 220 receives strokes. The plurality of first decoders 211, 213, and 215 are connected to each other, and the series of first decoders 211, 213, and 215 connected to each other may receive strokes (e.g., the initial strokes 240, etc.) and transfer the strokes obtained through the conversion. Attention-based transformer decoders may be applied as the first decoders 211, 213, and 215. A multi-layer perceptron (MLP) decoder may be applied as the second decoder 220.

The stroke generation model 200 may include a plurality of intermediate layers 212, 214, and 216. The intermediate layers 212, 214, and 216 extract intermediate strokes 250, which are the strokes obtained through the conversion of the first decoders 211, 213, and 215.

The first decoders 211, 213, and 215 and the intermediate layers 212, 214, and 216 may be connected to each other, and may be formed in a structure in which one includes the other. For example, the first decoders 211, 213, and 215 may include the intermediate layers 212, 214, and 216, or the intermediate layers 212, 214, and 216 may include the first decoders 211, 213, and 215.

The stroke rendering model 300 generates a final sketch 350 by mapping a stroke vector, which is the final strokes 260, to pixels in an image area. The stroke vector may include the parameterized information of four control points p1, p2, p3, and p4 related to a cubic Bezier curve, color information, and thickness information. The stroke rendering model 300 visualizes the vector information by converting it into a pixel-based raster image.

The stroke rendering model 300 sets the mapping between the strokes and the image area as a differentiable rendering function in order to propagate the gradient of a perceptual loss function to the stroke generation model 200. The stroke rendering model 300 may set each pixel value as a rendering function that represents the square distance between pixel coordinates and the stroke vector in the form of a negative exponent. In the former stage of learning, the thickness of the strokes is not changed, but the plurality of control points of the strokes are mainly learned, whereas, in the latter stage of learning, the thickness information may be applied to the form of the exponents related to the distance.

The stroke rendering model 300 may over-compose the plurality of strokes, and may apply a cumulative product, representing the sum of log differences between the image area and the stroke vector in an exponential form, during the over-composition process. The stroke rendering model 300 may make settings so that a color painted later replaces a color painted previously in order to prevent an intermediate color in which a plurality of colors are mixed from occurring at a point where the plurality of strokes intersect.

The learning model applied to the apparatus 100 for conversion into sketches may include one or more layers, the nodes of the one or more layers may be connected over a network, information may be extracted from a layer through an operator, the extracted information may be transferred to another layer, and the process of varying the dimensions of the extracted information through sampling may be performed. The learning model may learn parameters included in the learning model. The layer may include learnable parameters, and the parameters may include weights between nodes.

The learning model of the apparatus 100 for conversion into sketches is trained such that a predefined loss function is minimized.

The loss function is defined by taking into consideration (i) a perceptual loss function $\mathcal{L}_{percept}$ that measures the geometric and semantic similarities between the target image and the final sketch 350, (ii) a guide loss function $\mathcal{L}_{guide}$ for intermediate guide strokes that is invariant to the sequence of the strokes and is used as guidance information for the intermediate layers of the stroke generation model, and (iii) an embedding loss function $\mathcal{L}_{embed}$ for the stroke embedding model that is invariant to the sequence of the strokes and maps the plurality of final strokes to the embedding space.

The perceptual loss function $\mathcal{L}_{percept}$, which measures the similarity between the target image and the final sketch, is represented by Equation 1 below:

$$\mathcal{L}_{percept} = \mathcal{L}_{geometric} + \lambda_s \cdot \mathcal{L}_{semantic} \tag{1}$$

The perceptual loss function $\mathcal{L}_{percept}$ may be represented as a loss function for geometric similarity $\mathcal{L}_{geometric}$ and a loss function for semantic similarity $\mathcal{L}_{semantic}$. In this case, $\lambda_s$ is a hyperparameter. For example, $\lambda_s$ may be set to 0.1, but other values may be applied depending on required design details.

The loss function $\mathcal{L}_{geometric}$ for geometric similarity and the loss function $\mathcal{L}_{semantic}$ for semantic similarity are represented by Equation 2 and Equation 3, respectively, below:

$$\mathcal{L}_{geometric} = \sum_{A \in \mathcal{A}} \sum_i \phi_i(A(I), A(S)) \tag{2}$$

$$\mathcal{L}_{semantic} = \sum_{A \in \mathcal{A}} \phi(A(I), A(S)) \tag{3}$$

The loss function $\mathcal{L}_{geometric}$ for geometric similarity may measure the similarity on the intermediate layers of the CLIP model in order to generate a sketch having high geometric similarity to the input image. The loss function $\mathcal{L}_{semantic}$ for semantic similarity may measure the similarity on the embedding space of the CLIP model in order to generate a sketch having high semantic similarity to the input image.

I is the input image, S is the generated sketch, and A denotes a set of affine transformations.

In Equation 3, $\phi(x, y)$ is the cosine similarity of the CLIP embedding for input (x, y), and, in Equation 2, $\phi_i(x, y)$ is the L2 distance (the minimum distance between two vectors) of the output value of the i-th intermediate layer of the CLIP model. For example, the ResNet101 CLIP model may be applied, and the output values of the 3-rd and 4-th intermediate layers may be applied.

Figure 4:
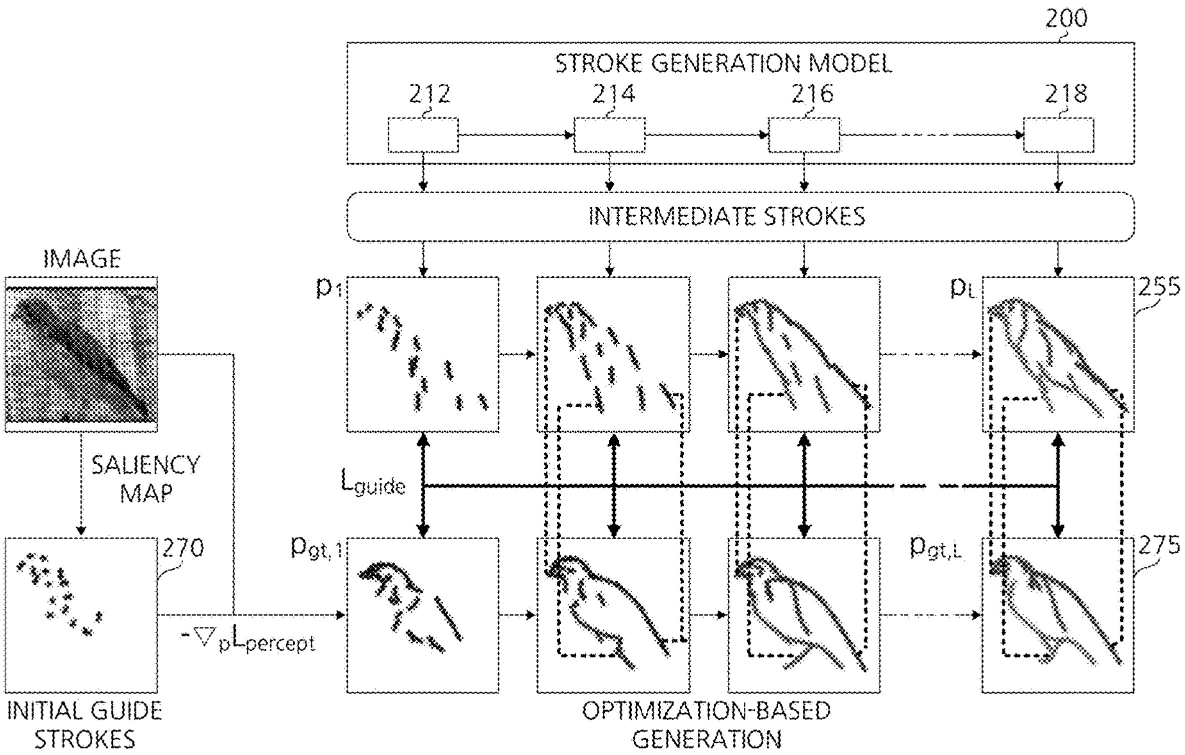
FIG. 4 is a diagram illustrating guide information applied in the learning process of an apparatus for conversion into sketches according to an embodiment.

FIG. 4 is a diagram illustrating guide information applied in the learning process of the apparatus 100 for conversion into sketches according to an embodiment.

The stroke generation model 200 may gradually update strokes in such a manner as to predict intermediate strokes through the intermediate layers 212, 214, 216, and 218 of the stroke generation model 200, and may refer to the intermediate guide stroke 275, generated in the process of updating the initial guide strokes 270 generated from a saliency map for the target image, as guide information for the intermediate strokes.

A high level of inference is required for the apparatus 100 for conversion into sketches to abstract a sketch from an image in a single inference step. Conventional technology, such as the technology disclosed in non-patent document 1, solve this problem with an optimization-based approach. However, this scheme takes a lot of time to generate the sketch. Furthermore, the process of directly optimizing each stroke over thousands of steps is not suitable as a representation learning model because the results are considerably variant and numerically unstable.

The stroke generation model 200 utilizes an optimization-based approach as guide information for the stroke generation model 200, which is a single inference model, thereby allowing a numerically stable representation to be generated. Furthermore, in order to generate a high-quality sketch, the intermediate strokes obtained at the respective intermediate stages of the optimization process are used as guide information for the intermediate layers of the stroke generation model 200. This process leads to a gradual update of the strokes of the previous layer, which can be modeled as the residual block structure of a transformer architecture. Through this process, the stroke generation model 200 is trained to predict the optimization process of a relatively small section at each intermediate stage instead of predicting the overall optimization process, thereby allowing a sketch having better quality to be generated.

To ensure invariance to the permutation between the sequences of individual strokes, the apparatus 100 for conversion into sketches calculates a guide loss function $\mathcal{L}_{guide}$ that is invariant to the sequence between individual strokes, as shown in Equation 4, by using the Hungarian Algorithm used in the assignment problem.

$$\mathcal{L}_{guide} = \sum_{l=1}^{L} \min_{\sigma} \sum_{i=1}^{n} \mathcal{L}_1\left(p_{gt,l}^{(i)}, p_l^{(\sigma(i))}\right) \tag{4}$$

In this case, σ denotes the permutation between the sequences of strokes.

$$p_l^{(i)}$$

denotes the i-th stroke 255 decoded in an 1-th intermediate layer among a total of L layers, $\mathcal{L}_1$ denotes the $\mathcal{L}1$ distance (the sum of the absolute values of the differences between the individual elements of two vectors), and $$p_{gt,l}^{(i)}$$

denotes the intermediate guide stroke 275, which is guide information corresponding to $$p_l^{(\sigma(i))}.$$

The final strokes 260 used in the sketch mainly represent local and detailed information, and may thus be inappropriate for representing information about the overall image. To overcome this problem, a representation $Z_h$ 450 for all the strokes is generated through the stroke embedding model 400.

The stroke embedding model 400 uses a permutation invariant model (a permutation invariant network) to generate a representation regardless of the sequence of individual strokes for a set of a total of n strokes. The embedding loss function $\mathcal{L}_{embed}$ used to learn the generated embedding $Z_h$ may use a desired loss function such as cross entropy loss or the info noise contrastive estimation (InfoNCE) loss of contrastive learning.

The final loss function $\mathcal{L}_{LBS}$ applied to the apparatus 100 for conversion into sketches is represented by Equation 5 below:

$$\mathcal{L}_{LBS} = \mathcal{L}_{percept} + \lambda_g \cdot \mathcal{L}_{guide} + \lambda_e \cdot \mathcal{L}_{embed} \tag{5}$$

The overall loss function $\mathcal{L}_{LBS}$ is defined by taking into consideration (i) a perceptual loss function $\mathcal{L}_{percept}$ that measures the geometric and semantic similarities between the target image and the final sketch, (ii) a guide loss function $\mathcal{L}_{guide}$ for intermediate guide strokes that is invariant to the sequence of the strokes and is used as guidance information for the intermediate layers of the stroke generation model, and (iii) an embedding loss function $\mathcal{L}_{embed}$ for the stroke embedding model that is invariant to the sequence of the strokes and maps the plurality of final strokes to the embedding space. In this case, $\lambda_g$ and $\lambda_e$ are hyperparameters.

The representation 500 output by the apparatus 100 for conversion into sketches may include a stroke representation set obtained by selecting a plurality of representations from among (i) a representation 235 of the image information, (ii) a representation 265 of the plurality of final strokes, and (iii) a representation 450 of all the strokes obtained by mapping the plurality of final strokes to an embedding space, and then combining them.

The representation $Z_p=(p^{(1)}, \ldots, p^{(n)})$ 265 generated from the strokes by the apparatus 100 for conversion into sketches is obtained by combining the parameters of the individual strokes $p^{(i)}$ in a vector form. Through this, high-dimensional geometric features of the image may be represented.

To represent information that is difficult to encode into a sketch such as the texture of an image, the apparatus 100 for conversion into sketches may output a representation Z 235 generated through the global average pooling of the image information generated through the encoder 230.

The apparatus 100 for conversion into sketches may output the representation Z 450 that aggregates overall stroke information.

The apparatus 100 for conversion into sketches may select and transfer (i) the representation 235 of the image information, (ii) the representation 265 of the plurality of final strokes, and (iii) the representation 450 of all the strokes, may transfer a representation set 501, obtained by combining the representation 235 of the image information and the representation 265 of the plurality of final strokes, as a stroke representation, or may transfer a representation set 520, obtained by combining the representation 235 of the image information, the representation 265 of the plurality of final strokes, and the representation 450 of all the strokes, as a stroke representation.

Figure 5:
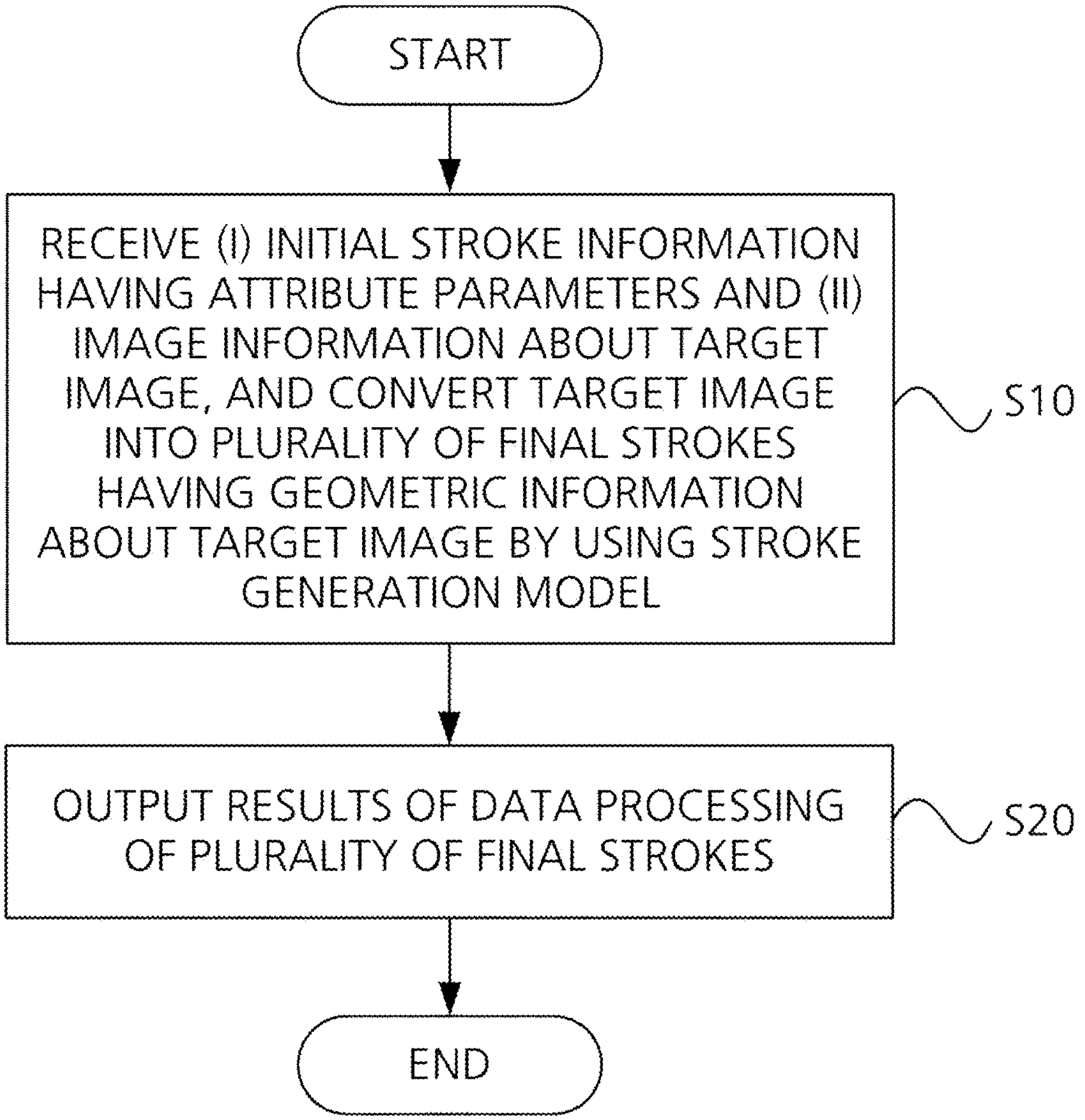
FIGS. 5 and 6 are flowcharts of a method for conversion into sketches according to an embodiment.
Figure 6:
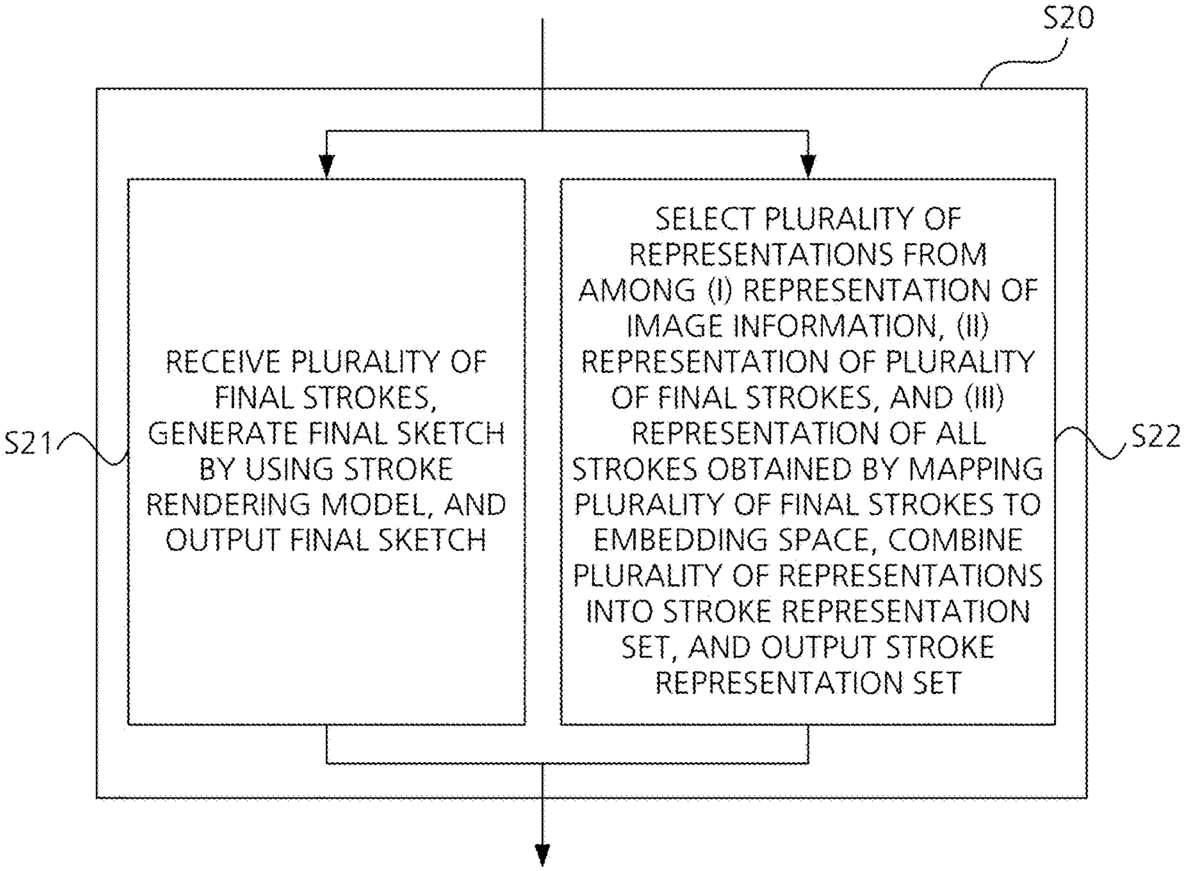

FIGS. 5 and 6 are flowcharts of a method for conversion into sketches according to an embodiment.

The method for conversion into sketches according to the embodiment shown in FIGS. 5 and 6 includes steps that are processed in a time-series manner by the apparatus for conversion into sketches shown in FIGS. 1 to 4. Accordingly, the descriptions that are omitted below but have been given above in conjunction with the apparatus for conversion into sketches shown in FIGS. 1 to 4 may also be applied to the method for conversion into sketches according to the embodiment shown in FIGS. 5 and 6.

Referring to FIG. 5, in step S10, the apparatus 100 for conversion into sketches receives (i) initial strokes having attribute parameters and (ii) image information about a target image, and converts them into a plurality of final strokes having geometric information about the target image by using a stroke generation model. The plurality of final strokes may include curve control points, color information, and thickness information.

In step S20, the apparatus 100 for conversion into sketches outputs the results of data processing of the plurality of final strokes.

Referring to FIG. 6, step S20 of outputting the results of data processing of the plurality of final strokes may include step S21 of receiving the plurality of final strokes, generating a final sketch using a stroke rendering model, and outputting the final sketch.

Step S20 of outputting the results of data processing of the plurality of final strokes may include step S22 of selecting a plurality of representations from among (i) a representation of the image information, (ii) a representation of the plurality of final strokes, and (iii) a representation of all the strokes obtained by mapping the plurality of final strokes to an embedding space, combining the plurality of representations into a stroke representation, and outputting the stroke representation.

The stroke generation model applied to the method for conversion into sketches may be trained such that a predefined loss function is minimized. The loss function may be defined by taking into consideration (i) a perceptual loss function that measures the geometric and semantic similarities between the target image and the final sketch, (ii) a guide loss function for intermediate guide strokes that is invariant to the sequence of the strokes and is used as guidance information for the intermediate layers of the stroke generation model, and (iii) an embedding loss function for a stroke embedding model that is invariant to the sequence of the strokes and maps the plurality of final strokes to the embedding space.

Figure 7:
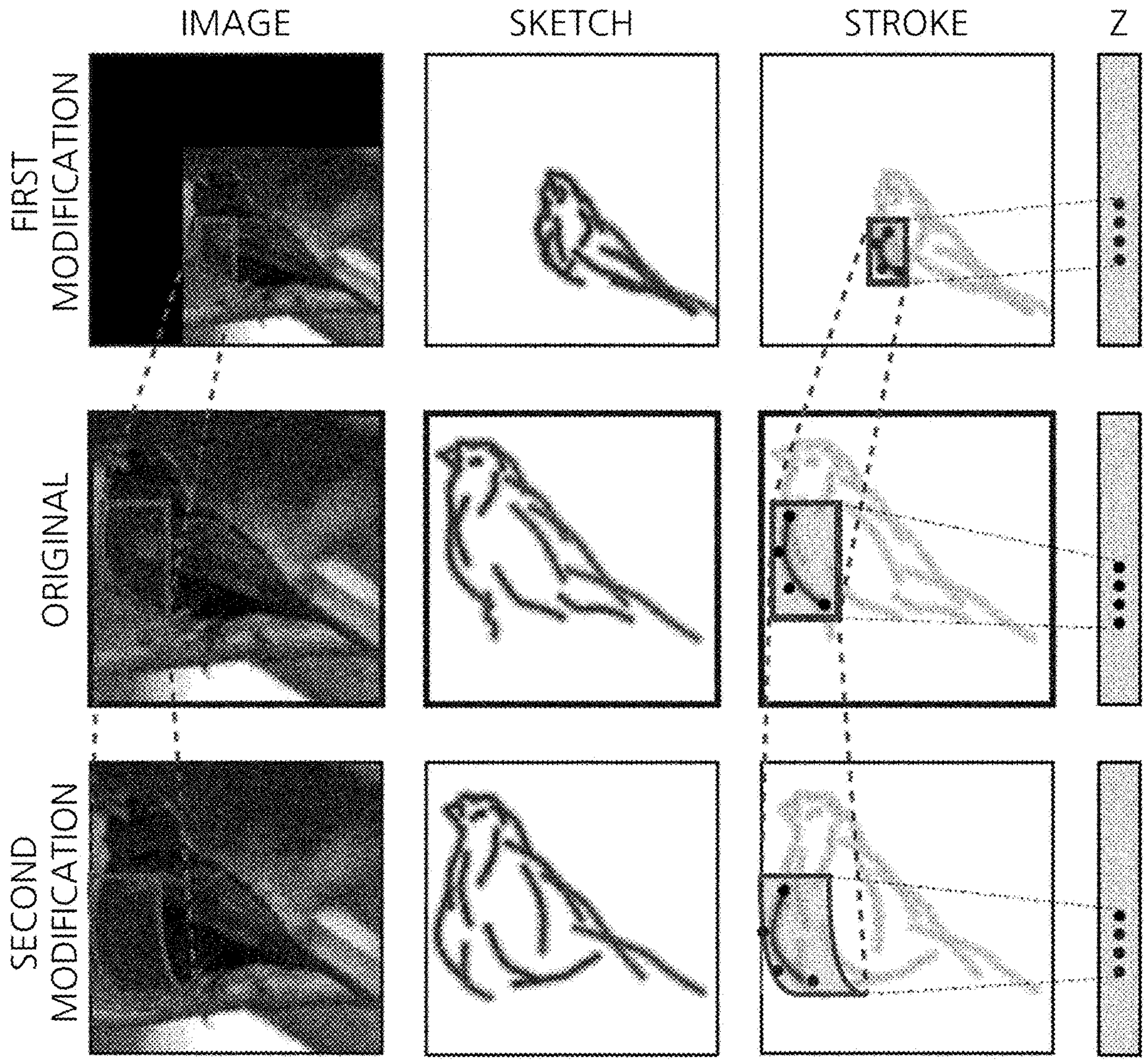
FIG. 7 is a diagram illustrating the relationships between sketches, visualized strokes, and stroke representations generated by embodiments.

FIG. 7 is a diagram illustrating the relationships between sketches, visualized strokes, and stroke representations generated by embodiments.

According to embodiments, concise and explicit geometric features that reflect the high-level understanding of an image may be represented and the most important part of the image, excluding the background thereof and/or the like, may be represented to increase the semantic similarity with the original image under the condition that the number of strokes is limited. The generated stroke representation in a vector form may be clearly visualized through the process of rendering strokes as a sketch. The resulting sketch may be defined in a two-dimensional grid form.

Referring to FIG. 7, when first transformation and second transformation, which are geometric transformations such as size transformation, ratio transformation, rotation, and local distortion, are applied to an input original image, an equivalent geometric transformation may be applied to a generated sketch. Through this, it may be proven that the generated representation Z satisfies equivariance with respect to affine transformation. This geometric information is reflected in the strokes directly used for image representation.

Figure 8:
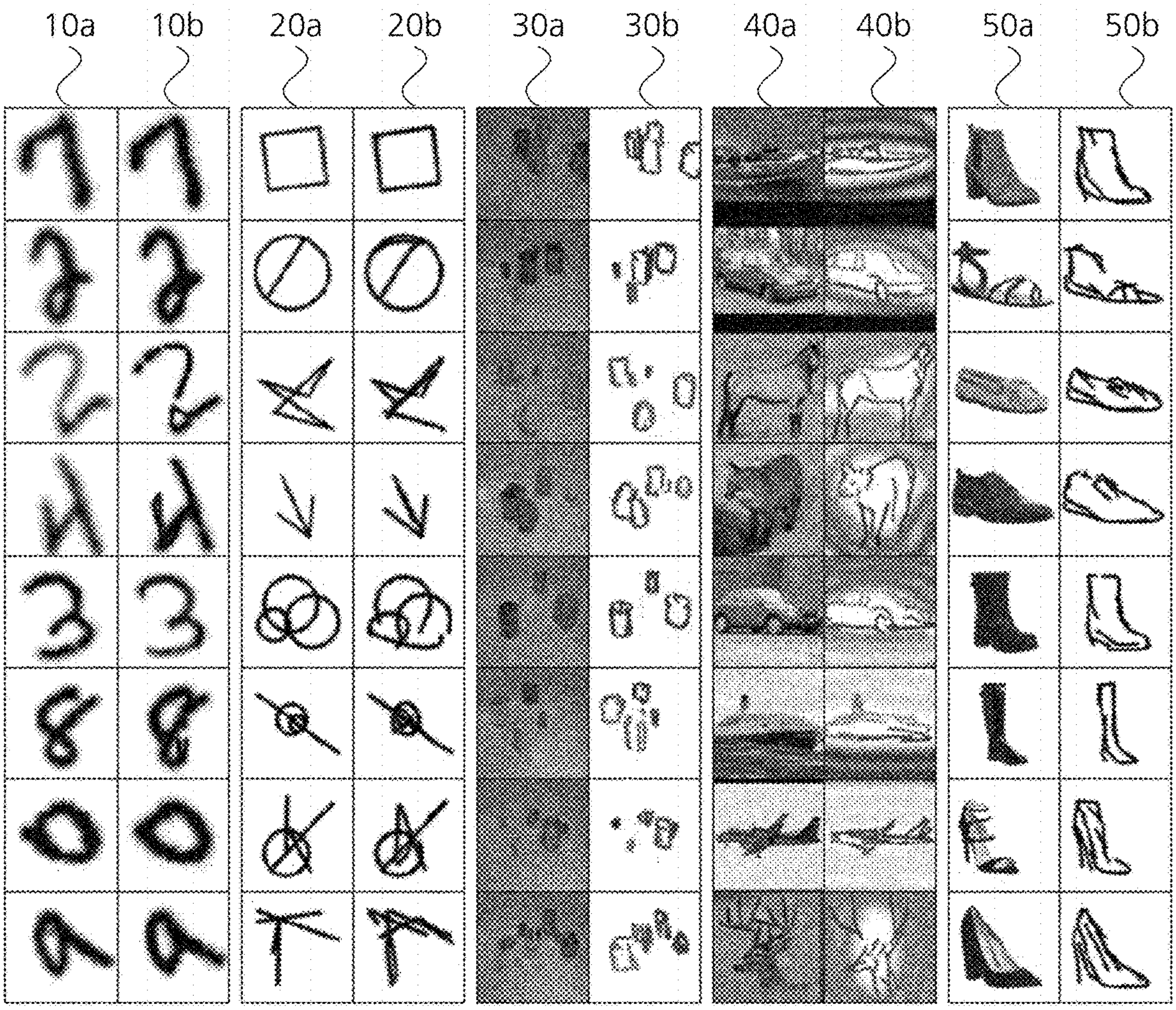
FIG. 8 is a diagram illustrating various sketches generated by embodiments.

FIG. 8 is a diagram illustrating various sketches generated by embodiments.

A conventional method that does not use a sketch dataset is mainly trained such that the distance between an original image and pixels is minimized. It is difficult for this method to represent an image concisely with only a small number of strokes. Accordingly, with the conventional method, it is difficult to accurately preserve geometric information while abstracting an image.

According to embodiments, these limitations are overcome by adopting a method that does not use sketch data and increases the semantic and geometric similarities with an original image based on a CLIP model.

According to embodiments, an abstracted sketch in which geometric information is desirably reflected may be generated through a single inference step without requiring a sketch dataset.

Referring to FIG. 8, it can be seen that individual sketches 10*b*, 20*b*, 30*b*, 40*b*, and 50*b* generated from images of image datasets according to various domains, such as rotated handwritten letters 10*a*, Euclidean geometric elements 20*a*, three-dimensional color shape arrangements 30*a*, object scenes with classes 40*a*, and shoe types 50*a*, concisely and accurately represent the sizes, locations, shapes, and colors of individual objects.

The embodiments do not use a sketch dataset, so that domain transfer on an image set for each domain can be performed and the embodiments can be applied as a learning algorithm for an aesthetic sketch generation model.

Sketch-based geometrical representation learning according to the embodiments may be used to accurately and concisely determine the location, distance, and direction of an object in various real-world tasks such as autonomous driving and robot manipulation, and may also provide core information for various types of vision processing such as image segmentation and pose estimation.

The term "unit" used in the above-described embodiments means software or a hardware component such as a field-programmable gate array (FPGA) or application-specific integrated circuit (ASIC), and a "unit" performs a specific role. However, a "unit" is not limited to software or hardware. A "unit" may be configured to be present in an addressable storage medium, and also may be configured to run one or more processors. Accordingly, as an example, a "unit" includes components, such as software components, object-oriented software components, class components and task components, processes, functions, attributes, procedures, subroutines, segments in program code, drivers, firmware, microcode, circuits, data, a database, data structures, tables, arrays, and variables.

The functions provided in components and "unit(s)" may be combined into a smaller number of components and "unit(s)" or divided into a larger number of components and "unit(s)."

In addition, components and "unit(s)" may be implemented to run one or more central processing units (CPUs) in a device or secure multimedia card.

The method for conversion into sketches according to an embodiment descried through the present specification may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the method for conversion into sketches according to an embodiment descried through the present specification may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the method for conversion into sketches according to an embodiment descried through the present specification may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

According to some of the above-described solutions, there may be proposed the apparatus and method for conversion into sketches that extract geometric information by using a stroke generation model that receives image feature information and initial strokes, which are a limited number of learnable parameters, and converts them into strokes used in a sketch.

According to some of the above-described solutions, there may be proposed the apparatus and method for conversion into sketches that generate a sketch through a differentiable stroke rendering model using a series of strokes including curve control points, color information, and thickness information and that also generate strokes having preserved geometric information by using a perceptual loss function that measures the similarity between the sketch and an image.

According to some of the above-described solutions, there may be proposed the apparatus and method for conversion into sketches that, instead of directly optimizing strokes by an optimization-based generation method, generate a numerically stable representation by utilizing the strokes, generated based on optimization, as guide information for a stroke generation model, which is a single inference model, and generate a high-quality sketch through an optimization process for each section by using the strokes, obtained in the intermediate stage of optimization-based generation, as guide information for the intermediate layers of a stroke generation model.

According to some of the above-described solutions, there may be proposed the apparatus and method for conversion into sketches that generate a representation for all strokes through a stroke embedding model and supplement the local and detailed information of the individual strokes with information about an overall image.

According to some of the above-described solutions, there may be proposed the apparatus and method for conversion into sketches that rapidly generate an abstracted sketch through the single inference step of a learning model, directly use a sketch in geometrical representation learning, and provide a representation learning model that can be used in various domains without a sketch dataset.

The advantages that can be achieved by the embodiments disclosed herein are not limited to the advantages described above, and other advantages not described above will be clearly understood by those having ordinary skill in the art, to which the embodiments disclosed herein pertain, from the foregoing description.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued through the present specification should be defined by the attached claims, rather than the detailed description. All modifications and variations which can be derived from the meanings, scopes and equivalents of the claims should be construed as falling within the scope of the present invention.

What is claimed is:

1. An apparatus for conversion into sketches for geometrical representation learning, the apparatus comprising:

an input/output interface configured to receive an image and output results of processing of the image;

a storage configured to store a program for performing a method for conversion into sketches; and a controller including at least one processor, and the controller configured to convert the image into a sketch by executing the program, wherein the storage stores an encoder, a stroke generation model comprising the encoder, and a stroke embedding model connected to the stroke generation model, wherein the stroke generation model includes a first decoder, a second decoder connected to the first decoder, and an intermediate layer connected to the first decoder, wherein the controller:

receives initial stroke information having attribute parameters and image information about a target image;

converts the target image into a plurality of final strokes having geometric information about the target image by using a stroke generation model; and outputs results of data processing of the plurality of final strokes as representations in a vector format, wherein the encoder extracts image features from the target image, wherein the first decoder receives strokes and the image features from the encoder and outputs converted strokes, wherein the intermediate layer receives the converted strokes from the first decoder and extracts intermediate strokes, wherein the second decoder receives the converted strokes from the first decoder and outputs the plurality of final strokes, wherein the stroke embedding model outputs a representation of all strokes obtained by mapping the plurality of final strokes received from the second decoder to an embedding space, and wherein, in a process of outputting the representations in the vector format, the controller is configured to:

convert the image features output by the encoder into a first representation in a vector format;

output a second representation in a vector format by combining parameters of each stroke included in the plurality of final strokes into a vector format;

output a third representation in a vector format regarding the representation of all strokes output by the stroke embedding model;

select the first representation, the second representation, and the third representation; and combine the first representation, the second representation, and the third representation.

2. The apparatus of claim 1, wherein:

the plurality of final strokes includes curve control points, color information, and thickness information; and when outputting the results of the data processing of the plurality of final strokes, the controller receives the plurality of final strokes, generates a final sketch by using a stroke rendering model, and outputs the final sketch.

3. The apparatus of claim 1, wherein the stroke generation model gradually updates the strokes in such a manner as to predict the intermediate strokes through intermediate layers of the stroke generation model, and refers to intermediate guide strokes generated in a process of updating initial guide strokes generated from a saliency map for the target image as guide information for the intermediate strokes.

4. The apparatus of claim 2, wherein the stroke generation model is trained such that a predefined loss function is minimized, and the predefined loss function is defined by taking into consideration a perceptual loss function that measures geometric and semantic similarities between the target image and the final sketch, a guide loss function for intermediate guide strokes that is invariant to a sequence of the strokes and is used as guidance information for intermediate layers of the stroke generation model, and an embedding loss function for the stroke embedding model that is invariant to the sequence of the strokes and maps the plurality of final strokes to an embedding space.

5. A method for conversion into sketches for geometrical representation learning, the method being performed by an apparatus for conversion into sketches, the method comprising:

storing, by a storage, an encoder, a stroke generation model connected to the encoder, and a stroke embedding model connected to the stroke generation model, wherein the stroke generation model includes a first decoder, a second decoder connected to the first decoder, and an intermediate layer connected to the first decoder;

receiving, by a controller, initial stroke information having attribute parameters and image information about a target image, and converting the target image into a plurality of final strokes having geometric information about the target image by using a stroke generation model; and outputting, by the controller, results of data processing of the plurality of final strokes as representations in a vector format, wherein the encoder extracts image features from the target image, wherein the first decoder receives strokes and the image features from the encoder, and outputs converted strokes, wherein the intermediate layer receives the converted strokes from the first decoder and extracts intermediate strokes, wherein the second decoder receives the converted strokes from the first decoder and outputs the plurality of final strokes, wherein the stroke embedding model outputs a representation of all strokes obtained by mapping the plurality of final strokes received from the second decoder to an embedding space; and wherein, in a process of outputting the representations in the vector format, the controller is configured to:

convert the image features output by the encoder into a first representation in a vector format;

output a second representation in a vector format by combining parameters of each stroke included in the plurality of final strokes into a vector format;

output a third representation in a vector format regarding the representation of all strokes output by the stroke embedding model;

select the first representation, the second representation, and the third representation; and combine the first representation, the second representation, and the third representation.

6. The method of claim 5, wherein outputting the results of the data processing of the plurality of final strokes comprises receiving the plurality of final strokes, generating a final sketch by using a stroke rendering model, and outputting the final sketch.

7. A non-transitory computer-readable storage medium having stored thereon a program that, when executed by a processor, causes the processor to execute the method set forth in claim 5.

* * * * *